No. 872,834.
PATENTED DEC. 3, 1907.
C. I. MATTINGLY.
PLOW ATTACHMENT.
APPLICATION FILED APR. 25, 1907.
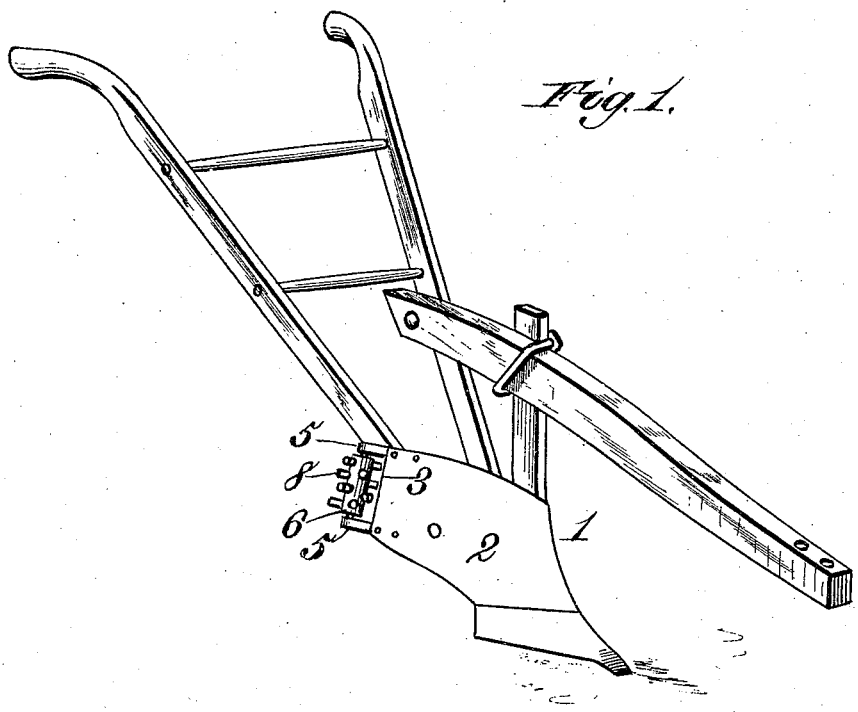
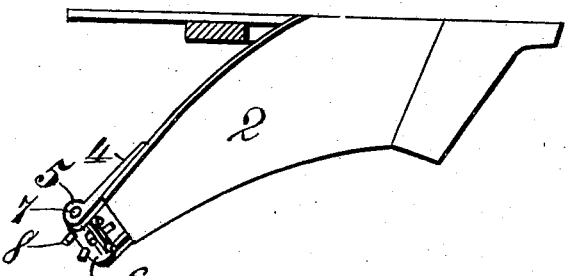
Witnesses
Robert Everett
F. B. Keeler
Inventor
Charles I. Mattingly,
By James L. Norris.
Atty.

UNITED STATES PATENT OFFICE.

CHARLES I. MATTINGLY, OF UNIONTOWN, KENTUCKY.

PLOW ATTACHMENT.

No. 872,834.  Specification of Letters Patent.  Patented Dec. 3, 1907.

Application filed April 25, 1907. Serial No. 370,290.

*To all whom it may concern:*

Be it known that I, CHARLES I. MATTINGLY, a citizen of the United States, residing at Uniontown, in the county of Union and State of Kentucky, have invented new and useful Improvements in Plow Attachments, of which the following is a specification.

This invention relates to a pulverizing attachment for a plow mold board, and the primary object of the same is to include in a plow structure means for pulverizing the soil, as well as greatly assisting in turning the latter, and thus save considerable farm labor by materially reducing the work of harrowing the soil after it has been plowed.

The attachment will not institute side draft on the plow, does not establish extra heaviness on a team, nor will it catch grass and weeds and become clogged, as it comes in contact only with the bottom of the soil turned up. Furthermore, the improved attachment can be cheaply manufactured and applied to plows now in use at a very small cost.

The details of construction will be more fully hereinafter specified.

In the drawing, Figure 1 is a perspective view of a plow embodying the features of the invention. Fig. 2 is a top plan view of a plow share showing a part of the plow structure in horizontal section and also particularly showing the relation of the attachment to the mold board.

Similar characters of reference are employed to indicate corresponding parts in the views.

The numeral 1 designates a plow of ordinary form and is intended to represent what is known as a breaker, and includes in its organization a mold board 2. The rear upper extremity of the mold board 2 is cut away, as at 3, and secured to the one side thereof are a pair of bearing arms 4, having rear terminal eyes 5. The arms 4 have an inclination relatively to each other corresponding to the angular disposition of the upper rear extremity of the mold board 2, and between the eyes 5 of the arms a roller 6 is mounted and has reduced extremities 7 rotatably held in the said eyes. The roller is provided with a plurality of radial teeth or comminuting devices 8. The roller 6 is practically in upright position with relation to the mold board 2, and projects outwardly far enough to be effective in acting upon the soil moving thereover from the mold board. The roller 6 will always freely rotate in the direction of movement of soil over the mold board, and thus no obstruction is set up or drag resistance instituted by the application of the attachment. Furthermore, the roller with its teeth or comminuting devices 8 engages the soil after the latter has passed full length over the mold board and has become fully turned, and entanglement with weeds or other trash is thus avoided, and the roller will be maintained in clean condition and clogging thereof prevented.

The approximately upright position of the cylindrical roller 6, the minimized projection thereof outwardly beyond the plane of the adjacent surface of the mold board, and the disposition of the said roller at the same angle of inclination as the adjacent portion of the mold board to which it is attached, are conditions of structure and arrangement which prevent side draft and heaviness of the team and insure effectiveness of operation of the roller in the manner desired. Furthermore, the attachment is located at the terminal of the mold board, and therefore the soil is entirely clear of the latter after passing over the roller.

The improved attachment may be readily applied to plows now in use, and will be found very advantageous in breaking up soil and economizing farm labor.

It is proposed to form the body of the roller of any suitable material, and changes in the proportions and dimensions thereof may be adopted to adapt the same for application to different sizes of mold boards.

Having thus described the invention, what is claimed, is:

1. The combination with a mold board of a plow having an elevated rear extremity, and a cylindrical roller held at a distance in rear of the said extremity of the plow and in approximately upright position, the roller being provided with comminuting devices and having a minimized projection outwardly beyond the plane of the adjacent surface of the mold board.

2. The combination with a mold board of a plow having a rear reduced elevated extremity and a cylindrical roller held in rear of the terminal of said extremity and at the same angle of inclination as the adjacent portion of the mold board to which it is attached, the roller being provided with comminuting devices and also having a minimized projection outwardly beyond the plane of the adjacent surface of the mold board to prevent side draft and heaviness of the team.

In testimony whereof I have hereunto set my hand in presence of two subscribing witnesses.

CHARLES I. MATTINGLY.

Witnesses:
 JAS. M. GOUGH,
 H. E. BINY.